United States Patent
Forsberg

[11] 3,731,542
[45] May 8, 1973

[54] OPTICAL ACCELEROMETER
[75] Inventor: John D. Forsberg, Wayzata, Minn.
[73] Assignee: Honeywell Inc., Minneapolis, Minn.
[22] Filed: Mar. 26, 1971
[21] Appl. No.: 128,260

[52] U.S. Cl..................................................73/516 R
[51] Int. Cl..............................................G01p 15/08
[58] Field of Search....................73/514, 517 R, 515, 73/516 R, 517 B, 71.1, 71.3; 250/224, 231 R, 227; 116/114 AH; 340/66, 262

[56] References Cited

UNITED STATES PATENTS

| | | | |
|---|---|---|---|
| 3,024,364 | 3/1962 | Wanetick | 250/83.3 R |
| 3,566,140 | 2/1971 | Granqvist | 250/227 |
| 2,831,670 | 4/1958 | Bourns et al. | 73/516 R |
| 3,463,931 | 8/1969 | Kormos | 250/231 R |

Primary Examiner—James J. Gill
Attorney—Charles J. Ungemach and Albin Medved

[57] ABSTRACT

An accelerometer for providing digital output signals indicative of predetermined levels of acceleration in either direction along a sensitive axis therein. A mass is displaced a defined distance whenever a predetermined acceleration is experienced. This displacement aligns an optical fiber path contained by the mass between a light source and a light sensor causing the light sensor to produce an output signal. Different levels of acceleration can be detected by the use of a plurality of optical fiber paths within the mass.

6 Claims, 5 Drawing Figures

OPTICAL ACCELEROMETER

BACKGROUND OF THE INVENTION

The present invention is an improvement in accelerometers.

Accelerometers which utilize and inertial mass and optical apparatus for the detection of the displacement of that mass as a measurement of acceleration exist in the prior art. However, the prior art accelerometers just described are complicated in structure and are not suitable for applications requiring high reliability under severe vibration and acceleration conditions. Furthermore, they produce an analogue output of the acceleration in only one direction along a sensitive axis.

The present accelerometer has a simplified construction and operation allowing it to operate reliably under severe conditions. A digital output is produced that indicates discrete positions of the inertial mass, thereby providing distinct output signals for a plurality of predetermined levels of acceleration in either direction along a sensitive axis.

BRIEF SUMMARY OF THE INVENTION

The present accelerometer produces a digital output representative of different levels of acceleration along a sensitive axis. A mass is slideably mounted along a sensitive axis in a housing and is retained in a predisposed position in the absence of acceleration by a spring between each end of the mass and the housing. A light source and a plurality of light sensors are located within the housing adjacent the mass. A plurality of optical fiber paths are contained within the mass at intervals along the length of the mass. The space within the housing contains a damping fluid. As the accelerometer experiences acceleration along the sensitive axis, the mass is displaced from its predisposed position. Each of the optical fiber paths is located within the mass so that when a predetermined acceleration occurs along the sensitive axis, an optical fiber path is aligned between the light source and one of the light sensors causing the light sensor to produce an output signal. Each optical fiber path is placed to cause an output signal from a light sensor for each predetermined level of acceleration along the sensitive axis.

DESCRIPTION OF THE PREFERRED EMBODIMENT

Figure 1:
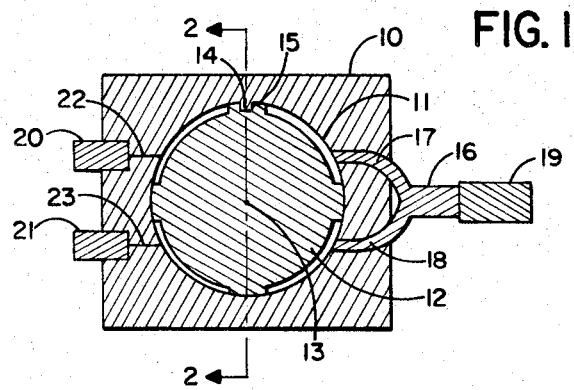
FIG. 1 is a cross section view of a preferred embodiment of the accelerometer.
Figure 2:
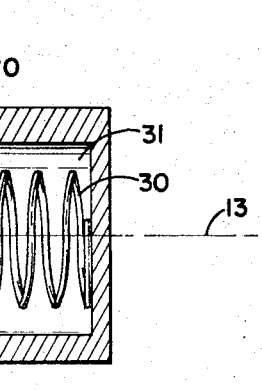
FIG. 2 is a cross section view of the embodiment of FIG. 1 taken along the line 2—2 of FIG. 1.

Referring to FIGS. 1 and 2, a housing 10 has a cylindrical cavity 11 therein. A cylindrical mass 12 is contained within cavity 11 and is free to move along a sensitive axis 13 which is colinear with the axis of cylindrical mass 12. Housing 10 has a guide pin 14 protruding into cavity 11. Cylindrical mass 12 has a linear recess 15 along its surface aligned with sensitive axis 13. Recess 15 is shaped to accept guide pin 14 for maintaining a predetermined orientation about sensitive axis 13 between cylindrical mass 12 and housing 10.

An optical fiber path 16 is contained by housing 10 and is shaped to transmit two beams of light via a channel 17 and a channel 18 from a light source 19. The plane containing channels 17 and 18 is perpendicular to the axis of cylindrical mass 12 and contains a zero acceleration axis 26 which is perpendicular to sensitive axis 13 and equidistant between the flat surfaces of cavity 11. A pair of phototransistors 20 and 21 are contained by housing 10. Phototransistors 20 and 21 produce an output signal when activated by light. A pair of optical fiber paths 22 and 23 are located within housing 10 for directing light from cavity 11 to phototransistors 20 and 21 respectively.

Cylindrical mass 12 contains four optical fiber paths 24, 25, 27, and 28. Fiber paths 24 and 25 extend through mass 12 equidistant from and on opposite sides of axis 26, where axis 26 passes through mass 12 equidistant from the flat surfaces of mass 12. Fiber paths 24 and 25 are positioned in mass 12 to transmit light from channel 17 to fiber path 22 when mass 12 is displaced an equal distance from axis 26 in either direction along sensitive axis 13. Fiber paths 24 and 25 have sufficient width parallel to sensitive axis 13 to maintain optical contact between channel 17 and fiber path 22 for greater displacements of mass 12 due to increased acceleration, thereby indicating that the existing acceleration continues to exceed a predetermined level. It may be necessary that fiber paths 24 and 25 have a width that maintains optical contact between channel 17 and fiber path 22 to the maximum displacement of mass 12. Fiber paths 27 and 28 also extend through mass 12 equidistant from and on opposite sides of axis 26 for transmitting light from channel 18 to optical fiber path 23 when mass 12 is displaced a predetermined distance in either direction along sensitive axis 13. However, fiber paths 27 and 28 are further from axis 26 than are fiber paths 24 and 25. The result is that optical contact between channel 18 and fiber path 23 is established only when mass 12 has been displaced a greater distance than is necessary for optical contact between channel 17 and optical fiber path 22.

Mass 12 is maintained at an equilibrium position during the absence of acceleration along sensitive axis 13 by a pair of calibrated loading springs 29 and 30 which are positioned within cavity 11 for compression when acceleration is experienced from either direction along sensitive axis 13. When mass 12 is at its equilibrium position, zero acceleration axis 26 is equidistant between fiber paths 24 and 25 and also between fiber paths 27 and 28. The remaining space within housing 10 is filled with a damping fluid 31 which does not vary its viscosity substantially over a desired temperature range. Also, damping fluid 31 must not substantially refract or suppress light transmission.

OPERATION

Figure 3:
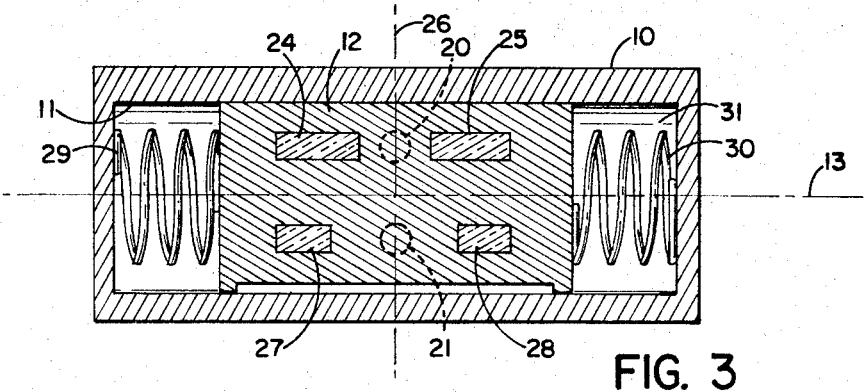
FIG. 3 is a cross section view of the preferred embodiment with no acceleration along the sensitive axis.
Figure 4:
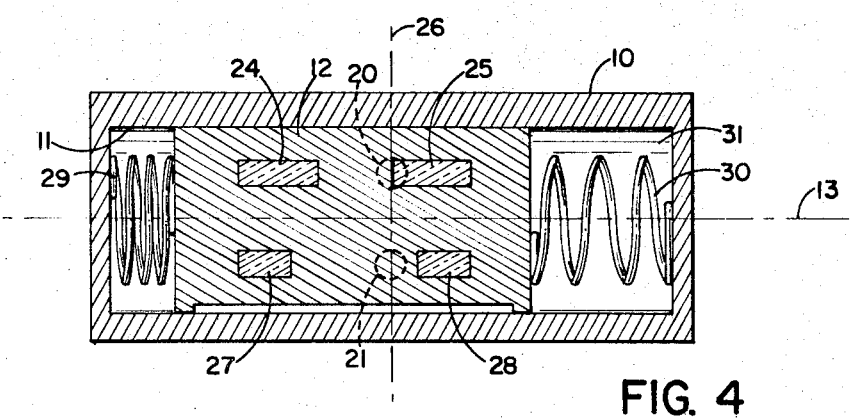
FIG. 4 is a cross section view of the preferred embodiment wherein the first level of acceleration along the sensitive axis is sensed.

The accelerometer described herein provides a digital output indicative of predetermined levels of acceleration in either direction along a sensitive axis. In the absence of acceleration along the sensitive axis, cylindrical mass 12 remains at its equilibrium position shown in FIG. 3 wherein mass 12 is centered about zero acceleration axis 26. In that position, no output signal is produced since mass 12 prevents light emitted by light source 19 from reaching phototransistors 20 and 21. As acceleration appears along sensitive axis 13, mass 12 compresses either load spring 29 or load spring 30 depending upon which direction along sensitive axis 13 the acceleration is directed. Assuming that an acceleration force appears along sensitive axis 13 from the left of axis 26 as viewed in FIG. 4, load spring 29 is compressed between mass 12 and housing 10 due to the inertial reaction of mass 12. However, no output signal is produced until mass 12 has been displaced to the position shown in FIG. 4. In that position optical fiber path 25 is aligned between channel 17 of optical fiber path 16 and optical fiber path 22 thus completing an optical circuit between light source 19 and phototransistor 20. Upon receiving a beam of light via this optical circuit, the phototransistor 20 produces an output signal thereby indicating that the predetermined level of acceleration for which optical fiber path 25 is located to measure has occurred.

Figure 5:
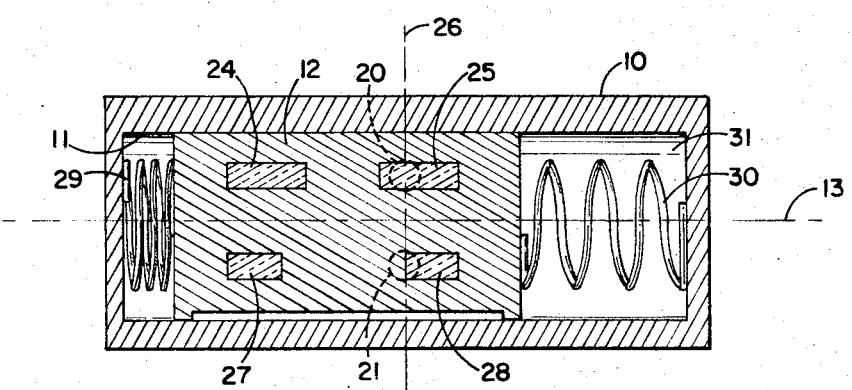
FIG. 5 is a cross section view of the preferred embodiment wherein a second level of acceleration along the sensitive axis is sensed.

Referring to FIG. 5, as the acceleration along sensitive axis 13 increases its magnitude from the left of axis 26, load spring 29 is further compressed by mass 12 until optical fiber path 28 is aligned between channel 18 of fiber path 16 and opticle fiber path 23 thereby completing an optical circuit between light source 19 and phototransistor 21. That circuit allows light from light source 19 to activate phototransistor 21 causing a second output signal indicative of a second level of acceleration along sensitive axis 13.

Two distinct levels of acceleration occurring along sensitive axis 13 from the right of zero acceleration axis 26 are similarly detected. As mass 12 is displaced to the right of axis 26 by an acceleration force from the right of axis 26, load spring 30 is compressed until optical fiber 24 is aligned between channel 17 and optical fiber path 22. An optical circuit is then completed which allows light source 19 to activate phototransistor 20. Increased acceleration from the right brings optical fiber path 27 into alignment between channel 18 and optical fiber path 23, thereby completing a second optical circuit that causes phototransistor 21 to produce an output signal.

Additional levels of acceleration could be detected by placing additional optical fiber paths within inertial mass 12 for completing optical circuits between additional light sources and phototransistors.

The orientation of light source 19 and phototransistors 20 and 21 about inertial mass 12 is not critical but need only be oriented such that an optical circuit is completed via an optical fiber path in response to the movement of mass 12. A discrete level of acceleration is indicated when the movement of mass 12 aligns the edge of an optical fiber path therein with the edges of the optical fiber paths in housing 10 that lead to the light sources and the phototransistors.

It may be desired to eliminate the optical fiber paths within housing 10 by placing phototransistors 20 and 21 and light source 19 adjacent cavity 11 with their light conducting edges positioned at axis 26.

The embodiment of the present invention just described is preferred. Variations in the preferred embodiment may be apparent to one of ordinary skill in the art. Such variations will not alter the scope and principle of the present invention.

I claim as my invention:

1. An accelerometer for indicating distinct bidirectional levels of acceleration along a sensitive axis comprising:
   a housing;
   an inertial mass mounted within said housing for motion along said sensitive axis;
   biasing means within said housing for maintaining said mass in a predetermined position along said sensitive axis in response to predetermined acceleration;
   a source of light at a first location within said housing;
   a light detector at a second location within said housing normally blocked from said source by said inertial mass; and
   light transmitting means within said inertial mass for transmission of light from said source to said detector only when said inertial mass is displaced a predetermined distance along said sensitive axis in response to an acceleration force of a predetermined magnitude.

2. The accelerometer of claim 1 wherein said light transmitting means is an optical fiber path.

3. The accelerometer of claim 1 wherein said light transmitting means is a plurality of optical fiber paths, each of said fiber paths being positioned within said mass for transmitting light from said source to a plurality of light detectors due to a different predetermined level of acceleration.

4. The accelerometer of claim 3 wherein said biasing means comprises a pair of calibrated load springs.

5. The accelerometer of claim 4 and a damping fluid contained within said cavity.

6. The accelerometer of claim 5 and a means attached within said housing for maintaining said mass in a predetermined orientation about said sensitive axis.

* * * * *